US008598255B2

(12) United States Patent
Hamai et al.

(10) Patent No.: US 8,598,255 B2
(45) Date of Patent: Dec. 3, 2013

(54) EARLY STRENGTHENING AGENT FOR HYDRAULIC COMPOSITION

(75) Inventors: Toshimasa Hamai, Wakayama (JP); Masaaki Shimoda, Wakayama (JP); Makoto Okubo, Wakayama (JP); Takao Taniguchi, Wakayama (JP); Takeshi Tomifuji, Wakayama (JP); Masato Nomura, Wakayama (JP)

(73) Assignee: Kao Corporation, Tokyo (JP)

( * ) Notice: Subject to any disclaimer, the term of this patent is extended or adjusted under 35 U.S.C. 154(b) by 238 days.

(21) Appl. No.: 13/000,926

(22) PCT Filed: Jul. 16, 2009

(86) PCT No.: PCT/JP2009/063228
§ 371 (c)(1),
(2), (4) Date: Jan. 18, 2011

(87) PCT Pub. No.: WO2010/008093
PCT Pub. Date: Jan. 21, 2010

(65) Prior Publication Data
US 2011/0100266 A1    May 5, 2011

(30) Foreign Application Priority Data

Jul. 18, 2008  (JP) .................................. 2008-187725

(51) Int. Cl.
*C08K 3/00* (2006.01)
*C08L 31/00* (2006.01)
*C08F 220/56* (2006.01)

(52) U.S. Cl.
USPC .................. 524/2; 524/3; 524/556; 524/547; 526/274; 526/277

(58) Field of Classification Search
USPC ........... 524/2, 3, 556, 547; 526/274, 277, 374
See application file for complete search history.

(56) References Cited

U.S. PATENT DOCUMENTS 5,117,032 A    5/1992   Fabry et al.
5,573,589 A    11/1996  Tanaka et al.

FOREIGN PATENT DOCUMENTS

| DE | 44 07 499 A1 | 9/1994 |
| DE | 44 46 371 A1 | 6/1996 |
| JP | 61-72664 A | 4/1986 |
| JP | 61-83659 A | 4/1986 |
| JP | 61-191547 A | 8/1986 |
| JP | 61191547 A * | 8/1986 |
| JP | 6-199557 A | 7/1994 |
| JP | 7-10624 A | 1/1995 |
| JP | 9-194244 A | 7/1997 |
| JP | 11-157897 A | 6/1999 |
| JP | 2000-103661 A | 4/2000 |
| JP | 2006-52381 A | 2/2006 |
| JP | 2006-282414 A | 10/2006 |

OTHER PUBLICATIONS

Notification of the First Office Action for corresponding Chinese Patent Application No. 200980128112.2, dated Oct. 30, 2012.
A machine generated English translation of JP-2000-103661-A, dated Apr. 11, 2000.
A machine generated English translation of JP-61-191547-A, dated Aug. 26, 1986.
A machine generated English translation of JP-61-72664-A, dated Apr. 14, 1986.
A machine generated English translation of JP-61-83659-A, dated Apr. 28, 1986.
A machine generated English translation of JP-6-199557-A, dated Jul. 19, 1994.
International Preliminary Report on Patentability and Translation of Written Opinion of the International Searching Authority issued on Feb. 8, 2011 in corresponding International Application No. PCT/JP2009/063228.
International Search Report, PCT/JP2009/063228, Sep. 15, 2009.
Notification of the 2nd Office Action for corresponding Chinese Patent Application No. 200980128112.2, dated Mar. 12, 2013.
Supplementary European Search Report for corresponding European Patent Application No. 09798017.1, dated Nov. 30, 2012.
Cement & Concrete, Japan Cement Association, vol. 3, No. 577, Mar. 1995, pp. 46-48.

* cited by examiner

*Primary Examiner* — Michael Bernshteyn
(74) *Attorney, Agent, or Firm* — Birch, Stewart, Kolasch & Birch, LLP

(57) ABSTRACT

The present invention provides the early strengthening agent for hydraulic compositions containing a compound (a) obtained by reacting (A) one or more compounds selected from polyhydric alcohols having 3 to 20 hydroxy groups and alkylene oxide adducts thereof with (B) a sulfating agent, and the additive composition for hydraulic compositions containing the compound (a).

16 Claims, No Drawings

EARLY STRENGTHENING AGENT FOR HYDRAULIC COMPOSITION

FIELD OF THE INVENTION

The present invention relates to an early strengthening agent for hydraulic compositions, an additive composition for hydraulic compositions and a hydraulic composition.

BACKGROUND OF THE INVENTION

Concrete products are produced by kneading materials such as cements, aggregates, water and dispersants (water reducing agents), placing in forms, and aging (curing). From the viewpoint of productivity (increasing a turnover rate of a form), it is important that a concrete product exhibits high strength in its initial stage. To achieve this, some measures have been taken, including (1) using an early-strength cement, (2) using various polycarboxylic acid compounds as an admixture to decrease a water amount in a cement composition, and (3) employing steam aging as a method of aging. From demands for higher productivity at this time, more shortened processes for aging may be requested. For example, some concrete products are required to exhibit a high strength (initial strength) after 16 hours aging. In general, an aging process includes complicated steps including a step of heating with steam and the like. Countermeasures for increasing an initial strength by changing a system design of these processes are not good practical means. Therefore, from the points of production cost and the like, there is a strong demand of the market for a simple method of producing a concrete having a high initial strength without changing a system design.

In addition, to shorten an aging period, steam aging is generally employed. However, use of steam leads an increased energy cost. Also from the viewpoint of reduction in energy cost (shortened period of steam aging/decreased aging temperature), there is a strong demand for such a method.

JP-A 2006-282414 discloses a strength improving agent for cement containing glycerol or an alkyleneoxide adduct to glycerol and a specific polycarboxylic acid copolymer.

JP-A 9-194244 discloses that a cement admixture is a combination of a compound selected from a polyether compound, being a dihydric alcohol, a sulfated compound thereof and a salt thereof with a sulfonic group-containing copolymer and the admixture is excellent in fluidity, slump-retaining property and air-retaining property, JP-A 7-10624 discloses an additive to cement, containing a sulfated polysaccharide, having a water-reducing property, a moderate viscosity and solubility in water, but not an excessive air-entraining property and an excessive curing-retarding property.

JP-A 9-194244 and JP-A 7-10624 do not suggest that sulfation of a polyhydric alcohol as a raw material shortens a curing time (causing faster curing) or increases an initial age strength (strength in short time) at room temperature after aging of, for example, 16 hours.

Further, in JP-A 9-194244, no remarkable difference in effects of fluidity, slump-retaining property and air-retaining property is observed between a polyether compound and a sulfated compound thereof.

SUMMARY OF THE INVENTION

The present invention relates to an early strengthening agent for hydraulic compositions, containing a compound (a) (hereinafter, referred to as the compound (a)) obtained by reacting (A) at least one compound selected from polyhydric alcohols having 3 to 20 hydroxy groups and alkylene oxide (hereinafter, referred to as AO) adducts thereof (hereinafter, referred to as the component (A)) with (B) a sulfating agent (hereinafter, referred to as the component (B)).

The present invention also relates to an early strengthening agent for hydraulic compositions, containing a sulfate ester (hereinafter, referred to as the compound (a')) of (A) at least one compound selected from polyhydric alcohols having 3 to 20 hydroxy groups and AO adducts thereof.

The present invention also relates to an additive composition for hydraulic compositions, containing the early strengthening agent of the present invention and a dispersant.

The present invention also relates to a hydraulic composition, containing the early strengthening agent of the present invention, a hydraulic powder, aggregates and water.

The present invention also relates to a concrete product containing the early strengthening agent of the present invention.

The present invention also relates to use of the compound (a) as an early strengthening agent for hydraulic compositions.

DETAILED DESCRIPTION OF THE INVENTION

The present invention provides an early strengthening agent for hydraulic compositions that increases a strength in a short time or an initial strength, that is, improves early strengthening property, and an additive composition for hydraulic compositions used for producing a cured hydraulic composition, for example, a concrete product, having good appearance with achieving such improvement of an initial strength.

According to the present invention, an early strengthening agent for hydraulic compositions improving an initial strength or early strengthening property in short time and an additive composition for hydraulic compositions containing the same are provided. Use of the early strengthening agent of the present invention can improve early strengthening property, and shorten an operation time due to shortened aging time, resulting in improved productivity. In addition, these effects can be easily obtained without special modification of facilities and steps.

<Compound (a) or Compound (a')>

The compound (a) is obtained by reacting the component (A) with the component (B), and is a component contributing to improving early strengthening property (early strengthening agent). The compound (a) is a sulfated product of the component (A), and generally includes a sulfate ester of the component (A) (partial sulfate ester and/or full sulfate ester), that is, the compound (a'). The compound (a') is a component contributing to improving early strengthening property (early strengthening agent). Hereinafter, description of the compound (a) sometimes includes the compound (a').

In the component (A), the number of hydroxy groups of the polyhydric alcohol is not less than 3 and not more than 20. When the number is 3 or more, the resulting compound (a) or (a') can fully exhibit its function. When the number is 20 or less, the resulting compound (a) or (a') has an appropriate molecular weight and can exhibits its function with a small dosage. The number of hydroxy groups of the component (A) is preferably not more than 10, and more preferably not more than 6. That is, the number of hydroxy groups of the component (A) is 3 to 20, preferably 3 to 10, and more preferably 3 to 6.

The number of carbon atoms of the component (A) is not less than 3. The number of carbon atoms is also preferably not more than 30, more preferably not more than 14, and even more preferably not more than 9. In a preferred embodiment of the compound (a), the polyhydric alcohol does not contain nitrogen and is obtained from a compound constructed with three elements, carbon, hydrogen and oxygen. That is, in the component (A), the number of carbon atoms of the polyhydric alcohol is preferably 3 to 30, more preferably 3 to 14, and even more preferably 3 to 9.

Preferred examples of the polyhydric alcohol include polyvinyl alcohols (hydroxy group number: 3 to 20), polyglycidols (hydroxy group number: 3 to 20), glycerol, diglycerol, polyglycerol (hydroxy group number: 5 to 20), trimethylolethane, trimethylolpropane, 1,3,5-pentanetriol, erythritol, pentaerythritol, dipentaerythritol, sorbitol, sorbitan, sorbitol-glycerol condensates, adonitol, arabitol, xylitol and mannitol. Examples of a sugar preferably used include hexoses such as glucose, fructose, mannose, idose, sorbose, gulose, talose, tagatose, galactose, allose, psicose and altrose; pentoses such as arabinose, ribulose, ribose, xylose, xylulose and lyxose; tetroses such as threose, erythrulose and erythrose; and other sugars such as rhamnose, cellobiose, maltose, isomaltose, trehalose, sucrose, raffinose, gentianose and melezitose. Sugar alcohols and sugar acids derived therefrom (sugar; glucose, sugar alcohol; glucit, sugar acid; gluconic acid) are also preferably included. Further, alkylene oxide adducts, partially etherified products and partially esterified products of these compounds are also preferably included. These may be used alone or in combination of two or more. In the present invention, from the viewpoint of early strengthening property in short time, among them, preferred polyhydric alcohols are sorbitol, glycerol and multimers thereof including polyglycerol, diglycerol and glycerol, and more preferred is glycerol. An alkylene oxide (hereinafter, referred to as AO) of the polyhydric alcohol-AO adduct is at least one selected from ethylene oxide (hereinafter, referred to as EO) and propylene oxide (hereinafter, referred to as PO). The polyhydric alcohol-AO adduct is preferably selected from compounds added with EO in an average molar amount of 0.5 to 6 mol, more preferably 0.5 to 3 mol.

From the viewpoint of increasing an initial age strength of a concrete, for example, a strength after placing in a form and aging in the air (20° C.) for 16 hours, or improving early strengthening property in short time of a concrete, the compound (a) or (a') is preferably obtained by reacting (sulfating) the component (A) with the component (B) in an average amount of 0.1 to 1.0 mol, more preferably 0.1 to 0.9 mol, even more preferably 0.1 to 0.7 mol, and even more preferably 0.1 to 0.4 mol per one mole of hydroxy group of the component (A). The component (B) can be any compound that is used as a sulfating agent. Examples of the compound include sulfuric anhydride such as $SO_3$ gas and liquid $SO_3$, sulfuric acid, fuming sulfuric acid, chlorosulfonic acid, and sulfuric anhydride/Lewis base complex. Among them, preferred for the component (B) is one or more compounds selected from $SO_3$ gas and liquid $SO_3$. A reacted amount of the component (B) per one mole of hydroxy group of the component (A) can be calculated from each mole number of the components (A) and (B) used in the reaction, the number of hydroxy groups in the component (A) and a concentration of sodium sulfate in the resultant compound (a) (the mole number of sodium sulfate that has not reacted with the component (A)).

In the present invention, the component (A) is one or more compounds selected from glycerol and glycerol-AO adducts, and more preferably a compound selected from glycerol and compounds obtained by adding AO to glycerol in an average amount of 0.5 to 6 mol, and more preferably 0.5 to 3 mol. AO in the adduct is preferably one or more compounds selected from EO and PO.

The compound (a) is preferably obtained by reacting the component (A) with the component (B) in an average amount of 0.3 to 3.0 mol, more preferably 0.3 to 2.0 mol per 1.0 mol of the component (A). Particularly preferably the component (A) is one or more compounds selected from (A1) glycerol and (A2) glycerol-EO adducts and glycerol-PO adducts. The component (B) can be any compound used as a sulfating agent. Examples of the compound include sulfuric anhydride such as $SO_3$ gas and liquid $SO_3$, sulfuric acid, fuming sulfuric acid, chlorosulfonic acid, and sulfuric anhydride/Lewis base complex. Among them, preferred for the component (B) is one or more compounds selected from $SO_3$ gas and liquid $SO_3$. A reacted amount of the component (B) per one mole of hydroxy group of the component (A) can be calculated from each mole number of the components (A) and (B) used in the reaction, the number of hydroxy groups in the component (A) and a concentration of sodium sulfate in the resultant compound (a) (the mole number of sodium sulfate that has not reacted with the component (A)).

In the present invention, the compound (a) is preferably a compound (a-1) obtained by reacting one or more compounds selected from (A1) glycerol and (A2) glycerol-EO adducts and glycerol-PO adducts with the component (B) in an amount of 0.3 to 3.0 mol, more preferably 0.3 to 2.7 mol, even more preferably 0.3 to 2.1 mol, and even more preferably 0.3 to 1.2 mol per 1.0 mol of selected compound (s) (hereinafter, referred to as the compound (a-1)). The compound (a), particularly the compound (a-1) can be used as the early strengthening agent for hydraulic compositions. In sulfation of the component (A), an index, a sulfation ratio is used. A sulfation ratio represents a ratio of sulfation of hydroxy group in the component (A). For example, a sulfation ratio of glycerol is 3.0 at the maximum. When an average two of three hydroxy groups in glycerol, an average one of three, and an average 0.5 of three are sulfated, sulfation ratios are 2.0, 1.0, and 0.5, respectively. The compound (a) or (a') preferably has a sulfation ratio of 0.5 to 10, and more preferably 0.5 to 3.0. When the component (A) is one or more compounds selected from components (A1) and (A2), the compound (a) or (a') more preferably has a sulfation ratio of 0.7 to 2.0, even more preferably 0.5 to 1.5, and even more preferably 0.9 to 1.2. A sulfation ratio can be calculated from each mole number of the components (A) and (B) used in the reaction and a concentration of sodium sulfate in the resultant compound (a) (the mole number of sodium sulfate that has not reacted with the component (A)).

The compound (a) is preferably obtained by reacting the component (A) with the component (B) in an average amount of 0.2 to 8.0 mol, more preferably 0.3 to 3.0 mol per 1.0 mol of the component (A). Preferred are one or more sulfated products of glycerol and glycerol-EO adducts and PO adducts. Among them, particularly preferred are compounds obtained by sulfating glycerol, a glycerol-EO adduct or a glycerol-PO adduct at 0.5 to 3.0 mol, more preferably 0.7 to 2.0 mol, and even more preferably 0.9 to 1.2 mol on an average.

The compound (a) is obtained by reacting the component (A) with the component (B). The production of the compound (a) can be performed according to known methods. Examples of the component (B) include sulfuric anhydride such as $SO_3$ gas and liquid $SO_3$, sulfuric acid, fuming sulfuric acid, chlorosulfonic acid, and sulfuric anhydride/Lewis base complex. Preferred are sulfuric anhydride such as $SO_3$ gas and liquid $SO_3$ and fuming sulfuric acid. Example of a method for sulfation include liquid phase processes such as of using a large excess amount of sulfuric acid, of using chlorosulfonic acid and of using sulfuric anhydride and gas-liquid mixed processes such as of using gaseous sulfuric anhydride diluted in an inert gas (preferably using a thin-film-type sulfating reactor). From the viewpoint of suppressing of generation of side-products, preferred are gas-liquid mixed processes. From the viewpoint of less amount of impurities and good economic potential, more preferred is a gas-liquid mixed process using gaseous sulfuric anhydride diluted in an inert gas.

For increasing solubility in water, the compound (a) can be used in the form of salt. Examples of the salt include monovalent salts such as a sodium salt and a potassium salt. The compound (a) having increased solubility in water can provide an aqueous solution thereof that is easy to handle.

The compound (a') is preferably a sulfate ester of the component (A) obtained by adding an average 0.3 to 3.0 mol of component (B) per 1.0 mol of the component (A). Particularly preferred are one or more esters in which the component (A) is selected from the components (A1) and (A2).

In the present invention, the compound (a') is preferably a sulfate ester or sulfate esters (a'-1) of one or more compounds selected from (A1) glycerol and (A2) glycerol-EO adducts and glycerol-PO adducts obtained by reacting an average 0.3 to 3.0 mol, more preferably 0.3 to 2.7 mol, even more preferably 0.3 to 2.1 mol, and even more preferably 0.3 to 1.2 mol of component (B) per 1.0 mol of the compound(s) (hereinafter, referred to as the compound (a'-1)). The compound (a'), particularly the compound (a'-1) can be used as the early strengthening agent for hydraulic compositions. A sulfation ratio of the compound (a'-1) is preferably 0.2 to 2.5, and more preferably 0.2 to 2.0. When the component (A) of the compound (a'-1) is one or more adducts selected from (A2) glycerol-EO adducts and glycerol-PO adducts, an average addition mole number of AO is preferably 0.5 to 6 mol, and more preferably 0.5 to 3 mol.

Among sulfated products of glycerol, glycerol-EO adducts and glycerol-PO adducts, the compound (a') is preferably a sulfate ester of glycerol, a glycerol-EO adduct or a glycerol-PO adduct at an average 0.5 to 3 mol, more preferably 0.7 to 2.0 mol, even more preferably 0.9 to 1.2 mol, and even more preferably 1.0 mol. That is, preferred are sulfuric acid triester, diester and monoester of glycerol, glycerol-EO adducts and glycerol-PO adducts, and more preferred are sulfuric acid monoester of glycerol, glycerol-EO adducts and glycerol-PO adducts.

The compound (a') is obtained by reacting the component (A) with the component (B). The production of the compound (a') can be performed according to known methods. Examples of the component (B) include sulfuric anhydride such as $SO_3$ gas and liquid $SO_3$ sulfuric acid, fuming sulfuric acid, chlorosulfonic acid, and sulfuric anhydride/Lewis base complex. Preferred are sulfuric anhydride such as $SO_3$ gas and liquid $SO_3$ and fuming sulfuric acid. Example of a method for sulfation include liquid phase processes such as of using a large excess amount of sulfuric acid, of using chlorosulfonic acid and of using sulfuric anhydride and gas-liquid mixed processes such as of using gaseous sulfuric anhydride diluted in an inert gas (preferably using a thin-film-type sulfating reactor). From the viewpoint of suppressing of generation of side-products, preferred are gas-liquid mixed processes. From the viewpoint of less amount of impurities and good economic potential, more preferred is a gas-liquid mixed process using gaseous sulfuric anhydride diluted in an inert gas.

The early strengthening agent for hydraulic compositions of the present invention is preferably used in such amount as that an amount of the compound (a) or (a') added to 100 parts by weight of hydraulic powder is 0.01 to 10 parts by weight based on solid content. That is, the early strengthening agent for hydraulic compositions of the present invention is preferably used in such amount as that an amount of the compound (a) or (a') added to 100 parts by weight of hydraulic powder is 0.01 to 5 parts by weight, more preferably 0.05 to 3 parts by weight, and even more preferably 0.1 to 2 parts by weight. A content of solids can be determined by introducing about 3 g of the compound (a) or (a') (when neutralized, an aqueous solution of a neutralized product) into an aluminium foil cup, weighing it, drying it for 2 hours at 105° C., weighing it again and calculating a difference between the weights measured before and after the drying.

From the viewpoint of ease of handle, the compound (a) or (a') may be in the form of aqueous solution. In this case, a concentration of the compound (a) is preferably 20 to 99% by weight, and more preferably 40 to 99% by weight.

It is thought that the early strengthening agent of the present invention facilitates dissolution of a gypsum component in a cement to facilitate production aluminate (C3A) monosulfate and simultaneously facilitates production and precipitation of calcium hydroxide derived from alite (C3S). That is, the early strengthening agent of the present invention facilitates hydration of both C3A and C3S that contribute an early age strength, resulting in effectively increased strength in short time.

Therefore, as the compound (a) or (a'), preferred is a compound that can form a calcium ion of a bidentate to tetradentate structure with one or more oxygen atoms selected from atoms derived from a hydroxy, an ether, a carboxyl and an ester groups in a molecule.

Similarly to common early strengthening agents, the compound (a) or (a') in the present invention can be used together with a hydraulic powder and the like to produce a hydraulic composition. Alternatively, a hydraulic powder containing the compound (a) or (a') of the present invention can be prepared and used to produce a hydraulic composition.

The compound (a) or (a') in the present invention is preferably used together with ingredients generally known as a concrete admixture such as phosphate ester polymers, polycarboxylic acid polymers, sulfonic acid copolymers, naphthalene polymers, melamine polymers, phenol polymers and lignin polymers. Ingredients preferably used together are components (C) and (D) described below, and more preferred are the component (C) and a combination of components (C) and (D).

<Additive Composition for Hydraulic Compositions>

The present invention can provide an additive composition for hydraulic compositions, containing the early strengthening agent for hydraulic compositions of the present invention (compound (a) or (a')) and a dispersant. From the viewpoint of increase of early strength of a cured hydraulic composition, the dispersant is preferably one or more copolymers selected from phosphate ester polymers of the component (C) and copolymers of the component (D).

<Component (C)>

From the viewpoint of increase of early strength of a cured hydraulic composition, the additive composition for hydraulic compositions of the present invention contains a phosphate ester polymer (C) obtained by copolymerizing a monomer 1 represented by the following formula (C1), a monomer 2 represented by the following formula (C2) and a monomer 3 represented by the following formula (C3) at pH 7 or below (hereinafter, referred to as the component (C)). Examples of the component (C) include a compound described in JP-A 2006-52381.

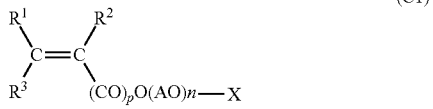

(C1)

(wherein, $R^1$ and $R^2$ each independently represent a hydrogen atom or a methyl group; $R^3$ represents a hydrogen atom or —COO(AO)$_n$X; AO represents an oxyalkylene or oxystyrene group having 2 to 4 carbon atoms; p is the number of 0 or 1; n is an average addition mole number of AO and represents the number of 3 to 200; and X represents a hydrogen atom or an alkyl group having 1 to 18 carbon atoms.)

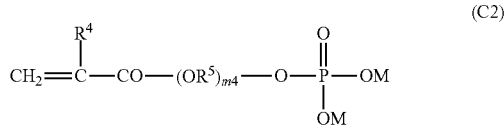

(C2)

(wherein, $R^4$ represents a hydrogen atom or a methyl group; $R^5$ represents an alkylene group having 2 to 12 carbon atoms; m4 represents the number of 1 to 30; and M represents a hydrogen atom, an alkaline metal or an alkaline earth metal (½ atom).)

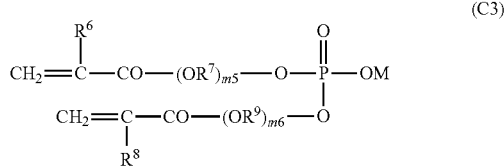

(C3)

(wherein, $R^6$ and $R^8$ each independently represent a hydrogen atom or a methyl group; $R^7$ and $R^9$ each independently represent an alkylene group having 2 to 12 carbon atoms; m5 and m6 each independently represent the number of 1 to 30; and M represents a hydrogen atom, an alkaline metal or an alkaline earth metal (½ atom).)

The component (C) is a phosphate ester polymer obtained by subjecting a mixture of monomers 1, 2 and 3 to copolymerization at pH 7 or below.

[Monomer 1]

For the monomer 1, in the formula (C1), $R^3$ is preferably a hydrogen atom. AO is preferably an oxyalkylene group having 2 to 4 carbon atoms, and more preferably includes an ethyleneoxy group (hereinafter, referred to as the EO group). A percentage of the EO group is preferably not less than 70% by mole, more preferably not less than 80% by mole, even more preferably not less than 90% by mole. It is even more preferable that the whole AO is the EO group. X is preferably a hydrogen atom or an alkyl group having 1 to 18 carbon atoms, more preferably 1 to 12 carbon atoms, even more preferably 1 to 4 carbon atoms, even more preferably 1 or 2 carbon atoms, and even more preferably a methyl group. Specific examples of the monomer 1 include ω-methoxypolyoxyalkylene methacrylates and ω-methoxypolyoxyalkylene acrylates. More preferred are ω-methoxypolyoxyalkylene methacrylates. From the point of effects for imparting dispersibility in a hydraulic composition and low viscosity to a polymer, in the formula (C1), n is 3 to 200, and preferably 4 to 120. In repeated AO units on an average number of n, different AOs may present in the mode of random addition or block addition or in a mixed mode thereof. AO may include a propyleneoxy group other than the EO group.

[Monomer 2]

The monomer 2 includes mono(2-hydroxyethyl) methacrylic acid phosphate ester, mono(2-hydroxyethyl)acrylic acid phosphate ester, and polyalkylene glycol mono(meth)acrylate acid phosphates.

Among these compounds, mono(2-hydroxyethyl) methacrylic acid phosphate ester is preferable from the viewpoint of production easiness and the stability of product quality.

[Monomer 3]

The monomer 3 includes di-[(2-hydroxyethyl)methacrylic acid]phosphate ester and di-[(2-hydroxyethyl)acrylic acid] phosphate ester. Among these compounds, di-[(2-hydroxyethyl)methacrylic acid]phosphate ester is preferable from the viewpoint of production easiness and the stability of product quality.

Both monomers 2 and 3 may be of salts of these compounds such as alkaline metal, alkaline earth metal, ammonium and alkylammonium salts.

From the viewpoint of dispersibility, m4 of the monomer 2 and m5 and m6 of the monomer 3 are each preferably 1 to 20, more preferably 1 to 10, and more preferably 1 to 5.

A monomer mixture containing these monomers can be used as the monomers 2 and 3. That is, commercial products containing a monoester and a diester can be used. Examples of the commercial product include Phosmer M, Phosmer PE, Phosmer P (Uni-Chemical Co., Ltd.), JAMP514, JAMP514P, JMP100 (Johoku Chemical Co., Ltd.), LIGHT-ESTER P-1M, LIGHT-ACRYLATE P-1A (Kyoeisha Chemical Co., Ltd), MR200 (Daihachi Chemical Industry Co., Ltd.), Kayamer (Nippon Kayaku Co., Ltd.) and ethyleneglycol methacrylate phosphate (Aldrich).

A phosphate polymer used as the component (C) in the present invention preferably has a weight average molecular weight (Mw) of 10,000 to 150,000, and preferably has Mw/Mn of 1.0 to 2.6. As used herein, the "Mn" refers a number average molecular weight. From the viewpoints of achievement of effects on dispersion and effects of decreasing viscosity, Mw is preferably not less than 10,000, more preferably not less than 12,000, even more preferably not less than 13,000, even more preferably not less than 14,000, and even more preferably not less than 15,000. From the viewpoints of prevention of cross-linking that causes increase of molecular weight and gelation and in terms of properties including effects on dispersion and effects of decreasing viscosity, Mw is preferably not more than 150,000, more preferably not more than 130,000, even more preferably not more than 120,000, even more preferably not more than 110,000, and even more preferably not more than 100,000. From both of the viewpoints, Mw is preferably 12,000 to 130,000, more preferably 13,000 to 120,000, even more preferably 14,000 to 110,000, and even more preferably 15,000 to 100,000. The polymer preferably has Mw within the range and Mw/Mn of 1.0 to 2.6. A value of Mw/Mn indicates a degree of variance (dispersion) of a molecular weight distribution. Mw/Mn closer to 1 means a molecular weight distribution closer to monodisperse, and Mw/Mn further from 1 (larger than 1) means a wider molecular weight distribution.

The phosphate polymer of the present invention having a value of Mw/Mn as above has a remarkable feature as it has a very narrow molecular weight distribution although it has a blanched structure due to a diester structure. Such a phosphate polymer can be adequately produced by the method described below.

From the viewpoint of ensuring practical productivity, dispersibility, effects of decreasing viscosity, and versatility for materials and temperatures, Mw/Mn of the phosphate polymer according to the present invention is not less than 1.0. From the viewpoint of balancing dispersibility and effects of decreasing viscosity, the Mw/Mn is not more than 2.6, preferably not more than 2.4, more preferably not more than 2.2, even more preferably not more than 2.0, and even more preferably not more than 1.8. From the integrated viewpoint, the Mw/Mn is preferably 1.0 to 2.4, more preferably 1.0 to 2.2, even more preferably 1.0 to 2.0, and even more preferably 1.0 to 1.8.

Mw and Mn of the phosphate polymer according to the present invention are measured according to a gel permeation chromatography (GPC) method described in JP-A 2006-52381. In this specification, Mw/Mn of the phosphate polymer of the present invention is calculated based on a measured peak of the polymer.

A phosphate polymer satisfying the condition of Mw/Mn, as described above, will be prevented from cross-linking with the monomer 3, which is a diester, to have an adequate blanched structure and thereby form a structure having adsorbing groups densely in a molecule. It is also considered that, by controlling the degree of dispersion Mw/Mn in a predetermined range, the system gets closer to a system in which molecules having the same size are rendered monodisperse, thus possibly increasing an amount of adsorbed one onto an object for adsorption, such as cement particles. It is estimated that by satisfying both conditions, the phosphate polymer enables dense packing the intended material such as cement particles therewith, thereby effectively attaining both dispersibility and viscosity-reducing effect.

From the viewpoints of dispersibility (decreasing requirement to be added) and effects of decreasing viscosity, in a pattern of a chart showing a molecular weight distribution obtained by the GPC method under the conditions described above, an area of molecular weight of not less than 100000 preferably accounts for not more than 5% of the total area of the chart.

$^1$H-NMR measurement under the conditions described below indicate that the phosphate polymer according to the present invention has structural units respectively derived from monomers 1, 2 and 3, because double bonds presented in monomers are not observed in the polymer.

[$^1$H-NMR Condition]

The polymer is dissolved in water, dried at a reduced pressure, dissolved in heavy methanol at a concentration of 3 to 4% by weight, and measured by $^1$H-NMR. A residual rate of double bond is measured as an integration value of 5.5 to 6.2 ppm. $^1$H-NMR measurement was performed with a Mercury 400 NMR manufactured by Varian under conditions of 42052 of data point number, 6410.3 Hz of measurement range, 4.5 μs of pulse width, 10 s of pulse waiting time, and 25.0° C. of measurement temperature.

As described above, a phosphate polymer having the Mw/Mn value as above includes structural units derived from monomers 1, 2 and 3. The monomers 1, 2 and 3 are cleaved at an ethylenic unsaturated bond to cause addition polymerization, resulting in the polymer including structural units derived from the monomers. A ratio of structural units in the polymer depends on a ratio of monomers used. If only the monomers 1, 2 and 3 are used for copolymerization, a molar ratio of structural units will give close agreement with a molar ratio of the monomers used.

<<Method for Producing Phosphate Polymer>>

The component (C) can be produced by known methods, including a method described in JP-A 2006-52381, for example.

In the present invention, two or more components (C) and three or more component (C) can be used. A criteria for selection of plural components (C) may depend on a composition, materials used and properties of a hydraulic composition. For example, a combination containing a copolymer (C1a) of monomers in which the monomer 1 represented by the formula (C1) accounts for 1 to 55% by mole of the total monomers and a copolymer (C1b) of monomers in which the monomer 1 accounts for more than 55% by mole of the total monomers is desired. When further selecting a third copolymer in addition to the (C1a) and the (C1b), or using three copolymers in total, a combination preferably contains two (C1b)'s, and more preferably the one copolymer (C1b) of monomers in which the monomer 1 accounts for more than 55% by mole and not more than 65% by mole of the total monomers (the second copolymer) and the other copolymer (C1b) of monomers in which the monomer 1 accounts for more than 65% by mole of the total monomers (the third copolymer).

<Component (D)>

From the viewpoint of improving early strengthening property of a cured hydraulic composition, the additive composition for hydraulic compositions of the present invention can contain a specific copolymer as a component (D). For the component (D), available admixtures containing the component (D) such as a dispersant for hydraulic compositions can be used.

The component (D) is a copolymer containing structural units derived from a monomer (i) represented by the following formula (D1-1) and derived from a monomer (ii) selected from monomers represented by the following formulae (D1-2) and (D1-3).

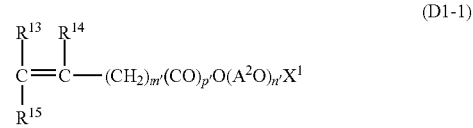
(D1-1)

(wherein,
$R^{13}$ and $R^{14}$ each represent a hydrogen atom or —$CH_3$;
$R^{15}$ represents a hydrogen atom or —COO(AO)$_n$X;
$A^2$ represents an alkylene group having 2 to 4 carbon atoms;
$X^1$ represents a hydrogen atom or an alkyl group having 1 to 18 carbon atoms;
m' represents the number of 0 to 2;
n' represents the number of 2 to 300; and
p' represents the number of 0 or 1.)

(D1-2)

(wherein,
$R^{16}$, $R^{17}$ and $R^{18}$, that may be same or different, each represent a hydrogen atom, —$CH_3$ or $(CH_2)_r$COOM$^2$, where $(CH_2)_rCOOM^2$ may form an anhydride with $COOM^1$ or other $(CH_2)_rCOOM^2$, and in this case, $M^1$ and $M^2$ thereof do not present;

$M^1$ and $M^2$ each represent a hydrogen atom, an alkaline metal, an alkaline earth metal (1/2 atoms), an ammonium group, an alkylammonium group or a substituted alkylammonium group; and r represents the number of 0 to 2.)

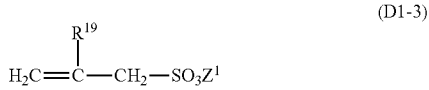

(D1-3)

(wherein, $R^{19}$ represents a hydrogen atom or $-CH_3$; and $Z^1$ represents a hydrogen atom, an alkaline metal, an alkaline earth metal (1/2 atoms), an ammonium group, an alkylammonium group or a substituted alkylammonium group.)

In the formula (D1-1), n' alkylene glycol $A^2O$'s may be same or different, and if different, may be in a random addition mode or block addition mode.

Considering polymerization efficiency of polyalkylene glycol, an addition mole number n' thereof must be not more than 300, and is preferably not more than 150, and more preferably not more than 130. From the viewpoint of cement dispersibility, n' is 2 to 300 mol.

Specific examples of the monomer (i) preferably used include (half) esterified products with (meth)acrylic acid and maleic acid and etherified products with (meth)allyl alcohols of polyalkylene glycols terminated with a lower alkyl group at one end such as methoxypolyethylene glycol, methoxypolypropylene glycol and ethoxypolyethylene polypropylene glycol, and ethylene oxide adducts and propylene oxide adducts of (meth)acrylic acid, maleic acid and (meth)allyl alcohols. In the formula (D1-1), $R^{15}$ is preferably a hydrogen atom, p' is preferably 1, and m' is preferably 0. The alkylene oxide (the $A^2O$ group in the formula (D1-1)) is preferably an oxyethylene group. The monomer (i) is preferably a (meth) acrylate of alkoxypolyethylene glycol, and more preferably of methoxypolyethylene glycol.

Examples of the monomer represented by the formula (D1-2) include unsaturated monocarboxylic acid monomers such as (meth)acrylic and crotonic acids, unsaturated dicarboxylic acid monomers such as maleic, itaconic and fumaric acids, and salts thereof such as alkaline metal, alkaline earth metal, ammonium and amine salts. Preferred are (meth)acrylic acid and alkaline metal salts thereof.

Examples of the monomer represented by the formula (D1-3) include (meth)allyl sulfonic acids and salts thereof such as alkaline metal, alkaline earth metal, ammonium and amine salts.

From the viewpoint of controlling a molecular weight of a copolymer, for the monomer (ii), only the monomer represented by the formula (D1-2) is preferably used.

In a monomer mixture for constructing the component (D), a total amount of the monomers (i) and (ii) is preferably not less than 50% by weight, more preferably not less than 80% by weight, and even more preferably 100% by weight. Examples of a copolymerizable monomer other than the monomers (i) and (ii) include acrylonitrile, alkyl (meth)acrylate, (meth)acrylamide and styrenesulfonic acid.

The component (D) can be produced by known methods. Examples of the method include solution polymerization in JP-A 11-157897. Briefly speaking, the method can be conducted for 0.5 to 10 hours at 50 to 100° C. in water or a lower alcohol having 1 to 4 carbon atoms in the presence of a polymerization initiator such as ammonium persulfate and hydrogen peroxide, or by adding sodium sulfite or mercaptoethanol.

The component (D) preferably has a weight average molecular weight (gel permeation chromatography/standard: sodium polystyrene sulfonate/water system) in the range of 10000 to 100000, and more preferably 10000 to 80000.

When a dispersant for hydraulic compositions containing the component (D) is used, the dispersant preferably contains the component (D) in an amount of 1 to 50% by weight, more preferably 10 to 40% by weight, and even more preferably 20 to 30% by weight. Further, the dispersant is preferably used in such amount as that the additive composition for hydraulic compositions of the present invention contains the component (D) in an amount of 1 to 50% by weight, more preferably 1 to 20% by weight, even more preferably 1 to 15% by weight, and even more preferably 1 to 10% by weight. In general, the rest parts of the dispersant are water, a defoaming agent, and other ingredients.

In the additive composition for hydraulic compositions of the present invention, a content of the compound (a) or (a') is preferably 5 to 95% by weight, more preferably 10 to 50% by weight, even more preferably 10 to 30% by weight, even more preferably 15 to 30% by weight, and even more preferably 20 to 30% by weight. From the viewpoint of increasing demolding strength or improving early strengthening property, the content is preferably not less than 5% by weight. From the viewpoint of uniformity and stability of a product, the content is preferably not more than 95% by weight.

In the additive composition for hydraulic compositions of the present invention, an amount of the compound (a) or (a') added to 100 parts by weight of hydraulic powder is preferably 0.01 to 10 parts by weight. In other words, the additive composition for hydraulic compositions of the present invention is preferably used in such amount as that a ratio of the compound (a) or (a') is 0.01 to 5 parts by weight, more preferably 0.05 to 3 parts by weight, and more preferably 0.1 to 2 parts by weight to 100 parts by weight of hydraulic powder.

In the additive composition for hydraulic compositions of the present invention, a content of the component (C) is preferably 1 to 50% by weight, more preferably 1 to 20% by weight, even more preferably 1 to 15% by weight, and even more preferably 1 to 10% by weight.

From the viewpoint of fluidity of a concrete, the additive composition for hydraulic compositions of the present invention is preferably used in such amount as that a ratio of the component (C) is 0.01 to 10 parts by weight, more preferably 0.1 to 5 parts by weight, and even more preferably 0.2 to 1 part by weight to 100 parts by weight of hydraulic powder.

From the viewpoint of early strength, in the additive composition for hydraulic compositions of the present invention, a weight ratio of a total amount of the compound (a) or (a') to a total amount of the component (C) is, represented by (C)/((a) or (a')), preferably 5/95 to 96/4, more preferably 5/95 to 65/35, even more preferably 5/95 to 50/50, even more preferably 5/95 to 30/70, and even more preferably 5/95 to 20/80.

From the viewpoint of ease of handing a product, in the additive composition for hydraulic compositions of the present invention, a total content of the compound (a) or (a') and the component (C) is preferably 10 to 100% by weight, more preferably 10 to 60% by weight, and even more preferably 20 to 40% by weight of the additive composition.

From the viewpoint of early strength, the additive composition for hydraulic compositions of the present invention is preferably used in such amount as that a ratio of a total amount of the compound (a) or (a') and the component (C) is preferably 0.1 to 10 parts by weight, more preferably 0.2 to 5 parts by weight, and even more preferably 0.2 to 1 part by weight to 100 parts by weight of hydraulic powder.

From the viewpoint of increasing fluidity of a concrete, the additive composition for hydraulic compositions of the present invention containing the component (D) is used in such amount as that the component (D) is preferably 0.01 to 10 parts by weight, more preferably 0.1 to 5 parts by weight, and even more preferably 0.2 to 1 part by weight to 100 parts by weight of hydraulic powder.

From the viewpoint of early strength, in the additive composition for hydraulic compositions of the present invention, a weight ratio of a total amount of the compound (a) or (a') to a total amount of the component (D) is, represented by (D)/((a) or (a')), preferably 5/95 to 96/4, more preferably 5/95 to 65/35, even more preferably 5/95 to 50/50, even more preferably 5/95 to 30/70, and even more preferably 5/95 to 20/80.

From the viewpoint of ease of handing a product, in the additive composition for hydraulic compositions of the present invention, a total content of the compound (a) or (a') and the component (D) is preferably 10 to 100% by weight, more preferably 10 to 60% by weight, and even more preferably 20 to 40% by weight of the additive composition.

From the viewpoint of early strength, the additive composition for hydraulic compositions of the present invention is preferably used in such amount as that a ratio of a total amount of the compound (a) or (a') and the component (D) is preferably 0.1 to 10 parts by weight, more preferably 0.2 to 5 parts by weight, and even more preferably 0.2 to 1 part by weight to 100 parts by weight of hydraulic powder.

From the viewpoints of early strength, low viscosity, and increased fluidity of a concrete, in the additive composition for hydraulic compositions of the present invention containing the components (C) and (D), a total content of the components (C) and (D) in the additive composition is preferably 1 to 50% by weight, more preferably 1 to 20% by weight, even more preferably 1 to 15% by weight, and even more preferably 1 to 10% by weight. In this case, a weight ratio of the component (C) to the component (D) is, represented by (D)/(C), preferably 1/100 to 80/100. In this range of the weight ratio, the upper limit for the component (D) is preferably (D)/(C)=65/100, more preferably 40/100, and even more preferably 30/100. The lower limit for the (D) is preferably (D)/(C)=3/100, more preferably 10/100, even more preferably 20/100.

From the viewpoint of early strength, in the additive composition for hydraulic compositions of the present invention, a weight ratio of a total amount of the compound (a) or (a') to a total amount of the components (C) and (D) is, represented by ((C)+(D))/((a) or (a')), preferably 5/95 to 96/4, more preferably 5/95 to 65/35, even more preferably 5/95 to 50/50, even more preferably 5/95 to 30/70, and even more preferably 5/95 to 20/80.

The additive composition for hydraulic compositions of the present invention can be used in any inorganic hydraulic powder curing by hydration, including various cements. The additive composition for hydraulic compositions of the present invention may be in a powder or liquid form. In cases of the liquid form, from the viewpoints of workability and low environmental load, the additive composition preferably contains water as a solvent or a dispersing medium (for example, aqueous solution).

Examples of the cement include ordinary Portland cement, early-strength Portland cement, ultra early-strength Portland cement and ecocement (for example, JIS R5214). Examples of the hydraulic powder other than the cement include blast furnace slag, fly ash, silica fume and non-hydraulic limestone micropowder. Cement mixtures such as a silica fume cement and a blast furnace slag cement may also be used.

The additive composition for hydraulic compositions of the present invention may further contain other additives. Examples of the additive include AE agents such as resin soaps, saturated and unsaturated fatty acids, sodium hydroxystearate, lauryl sulfate, alkylbenzenesulfonic acids (salts), alkane sulfonate, polyoxyalkylenealkyl (phenyl)ether, polyoxyalkylenealkyl (phenyl)ether sulfate esters (salts), polyoxyalkylenealkyl (phenyl)ether phosphate esters (salts), protein materials, alkenylsuccinic acids and α-olefin sulfonate; retarders including, for example, oxycarboxylic acids such as gluconic acid, glucoheptonic acid, arabonic acid, malic acid or citric acid, sugars such as dextrins, monosaccharides, oligosaccharides or polysaccharides and sugar alcohols; air-entraining agents; thickeners; silica sand; AE water reducing agents; early strengthening agents or accelerators including, for example, soluble calcium salts such as calcium chloride, calcium nitrite, calcium nitrate, calcium bromide or calcium iodide), chlorides such as iron chloride or magnesium chloride, sulfates, potassium hydroxide, sodium hydroxide, carbonates, thiosulfates, formic acid (salts) and alkanolamines; foaming agent; waterproof agents such as resin acids (salts), fatty acid esters, oil-and-fat, silicones, paraffins, asphalts and waxes; blast furnace slag; fluidizing agents; defoaming agents such as dimethylpolysiloxane-based, polyalkylene glycol fatty acid ester-based, mineral oil-based, oil-and-fat-based, oxyalkylene-based, alcohol-based and amide-based defoaming agents; anti-foaming agent; fly ash; high performance water reducing agents such as melamine sulfonic acid-formalin condensates and aminosulfonic acids; silica fume; anti-rusting agents such as nitrites, phosphates and zinc oxide; water-soluble polymers such as a cellulose type, e.g., methyl cellulose and hydroxyethyl cellulose, natural product type, e.g., β-1,3-glucan and xanthane gum and synthetic type, e.g., polyacrylic acid amide, polyethylene glycol and EO adducts of oleyl alcohol or reaction products of these EO adducts and vinylcyclohexenediepoxide; and emulsions of polymers such as alkyl(meth)acrylates. These components may be blended in a dispersant for a hydraulic composition.

The additive composition for hydraulic compositions of the present invention is useful in any type of concretes including ready-mixed concrete, vibration compaction concrete, self leveling concrete, refractory concrete, concrete for plaster, gypsum slurry concrete, light or heavy concrete, AE concrete, concrete for repairing, prepacked concrete, concrete for tremie concrete for soil improvement, concrete for grout, and concrete for cold weather.

<Hydraulic Composition>

The present invention provides a hydraulic composition containing the early strengthening agent for hydraulic compositions or the additive composition for hydraulic compositions of the present invention, a hydraulic powder and water.

The hydraulic composition of the present invention is a paste, mortar, or concrete, containing water and a hydraulic powder (cement). It may further contain an aggregate. Examples of the aggregate include fine aggregates and coarse aggregates. Preferred fine aggregates are pit sand, land sand, river sand and crushed sand. Preferred coarse aggregates are pit gravel, land gravel, river gravel and crushed stone. For some applications, light-weight aggregates may be used. Terms of aggregate are based on "Concuriito Souran (Concrete A to Z)," (1998, Jun. 10, Gijutsu Shoin).

The hydraulic composition preferably has a ratio of water/hydraulic powder (a ratio of water to the hydraulic powder by weight percentage (% by weight) in slurry, generally abbreviated to W/P, and also W/C in cases that the powder is cement) of not more than 65% by weight, more preferably not more than 60% by weight, even more preferably not more than 55% by weight, and even more preferably not more than 50% by weight. The ratio is also preferably not less than 20% by weight, and more preferably not less than 30% by weight. Accordingly, a range of W/P is preferably 20 to 65% by weight, more preferably 20 to 60% by weight, even more preferably 30 to 55% by weight, and even more preferably 30 to 50% by weight.

The hydraulic composition of the present invention may further contain a dispersant according to need. Examples of the dispersant include the components (C) and (D) and known dispersants. In the present invention, a combination use of the components (C) and (D) is preferred.

A preferred combination of the components (C) and (D) may be same to a preferred embodiment for the additive composition for hydraulic compositions. Therefore, the present invention provides a method for producing a hydraulic composition by blending the additive composition for hydraulic compositions of the present invention and water with a hydraulic powder and an aggregate.

According to the present invention, a concrete product can also be provided by curing a hydraulic composition containing the early strengthening agent for hydraulic compositions or the additive for hydraulic compositions of the present invention, a hydraulic powder, water, and if needed, an aggregate and/or a dispersant. The present invention is particularly useful for production of a concrete product by filling a hydraulic composition in a form and curing it, because the present invention achieves early strength to shorten a time to demold. The hydraulic composition containing the early strengthening agent of the present invention can provide a concrete product without requiring energy for facilitating curing such as steam-heating to increase productivity of the concrete product. Therefore, the hydraulic composition is very good for the environment. Examples of the concrete product provided using a form include civil engineering products such as blocks for revetment, box culverts, segments used in tunnel work and girders of bridge piers and building members used in curtain walls, posts, beams, floorboards, and the like.

EXAMPLES

The following Examples demonstrate the present invention. Examples are intended to illustrate the present invention, and not to limit the present invention.
<Ingredients of an Early Strengthening Agent for Hydraulic Compositions>
(1) Compound (a)

Preparation Example 1

Preparation of Sulfated Glycerol (a-01)

A thin-film sulfation reactor (inner diameter: 14 mmφ, length: 4 m) was used to sulfate glycerol under conditions of an $SO_3$ concentration of about 1% by volume (diluted with the dry air), a reaction molar ratio ($SO_3$/glycerol) of 0.89 and a temperature of 47 to 68° C. An $SO_3$ gas was used as a sulfating agent. 268.7 g of the sulfated product (acid value: 290.3 mgKOH/g) was added to 713.3 g of aqueous solution of 8.5% by weight sodium hydroxide. The pH of the resultant aqueous solution was adjusted to give an aqueous solution of a sulfated glycerol (a-01). The pH of the aqueous solution was 8.7, a volatile matter content was 65.3% by weight, and sodium sulfate was 0.5% by weight. Infrared absorption spectroscopy for nonvolatile matter showed an absorption associated with a sulfate ester bond at 1213 $cm^{-1}$. A composition of (a-01) was determined from a ratio of integration values of peaks of a proton nuclear magnetic resonance spectrum as follows: glycerol: 18.5%, glycerol-1-monosulfate: 44.6%, glycerol-2-monosulfate: 7.5%, glycerol-1,2-disulfate: 8.8%, glycerol-1,3-disulfate: 17%, glycerol-1,2,3-trisulfate: 3.5% (% by weight).

In Examples, an $SO_3$ gas was prepared according to the following operations. Sulfur was heated to melt, mixed with the dried air without moisture, and burned to give sulfur dioxide ($SO_2$). The resultant sulfur dioxide was mixed with the dried air, passed through a tube filled with an oxidizing catalyst (vanadium oxide) to produce an $SO_3$ gas at a concentration of about 5% by volume. To the $SO_3$ gas was added the dried air to produce an $SO_3$ gas at a concentration of about 1% by volume.

Preparation Example 2

Preparation of Sulfated Glycerol (a-02)

An aqueous solution of a sulfated glycerol (a-02) was prepared by the same method as of Preparation Example 1, except that a reaction molar ratio was ($SO_3$/glycerol)=1.15 (acid value of sulfated product: 374.5 mgKOH/g), and a temperature was 49 to 61° C. The pH of the aqueous solution was 9.7, a volatile matter content was 66.9% by weight, and sodium sulfate was 3.3% by weight. Infrared absorption spectroscopy for nonvolatile matter showed an absorption associated with a sulfate ester bond at 1213 $cm^{-1}$. A composition of (a-02) was determined from a ratio of integration values of peaks of a proton nuclear magnetic resonance spectrum as follows: glycerol: 9.4%, glycerol-1-monosulfate: 32.9%, glycerol-2-monosulfate: 7.4%, glycerol-1,2-disulfate: 18.9%, glycerol-1,3-di sulfate: 20.6%, glycerol-1,2,3-trisulfate: 10.70 (% by weight).

Preparation Example 3

Preparation of Sulfated Glycerol (a-03)

To 794.5 g of N,N-dimethylformamide (DMF) was added 87.0 g (1.09 mol) of liquid $SO_3$ dropwise with stirring for one hour at 0° C. To this was added 100.0 g (1.09 mol) of glycerol dropwise for 30 minutes. Then, the mixture was raised to 10° C. and stirred for one hour. To the mixture was poured 200.0 g of ion-exchanged water, and neutralized with 142.7 g (1.14 mol) of aqueous solution of 32% by weight sodium hydroxide. N,N-dimethylformamide (DMF) was removed with a rotary evaporator. To this was added further ion-exchanged water to give 881.3 g of aqueous solution of sulfated glycerol (a-03). The pH of the aqueous solution was 11.1, a volatile matter content (105° C., 2 hours) was 73.6% by weight, and sodium sulfate was 0.3% by weight. Infrared absorption spectroscopy for nonvolatile matter showed an absorption associated with a sulfate ester bond at 1217 $cm^{-1}$-A composition of (a-03) was determined from a ratio of integration values of peaks of a proton nuclear magnetic resonance spectrum as follows: glycerol: 32.4%, and glycerol-1,2,3-trisulfate: 67.6% (% by weight).

Preparation Example 4

Preparation of Sulfated Glycerol (a-04)

An aqueous solution of a sulfated glycerol (a-04) was prepared by the same method as of Preparation Example 3, except that 96.7 g (1.21 mol) of liquid $SO_3$, 873.9 g of N,N-dimethylformamide (DMF) and 55.0 g (0.60 mol) of glycerol were used. The pH of the aqueous solution was 11.0, a volatile matter content was 78.7% by weight, and sodium sulfate was 0.6% by weight. Infrared absorption spectroscopy for nonvolatile matter showed an absorption associated with a sulfate ester bond at 1217 $cm^{-1}$. A composition of (a-04) was determined from a ratio of integration values of peaks of a proton nuclear magnetic resonance spectrum as follows: glycerol: 8.3%, glycerol-1-monosulfate: 5.7%, glycerol-2-monosulfate: 2.1%, glycerol-1,2-disulfate: 3.1%, glycerol-1,3-disulfate: 7.3%, glycerol-1,2,3-trisulfate: 73.4% (% by weight).

Preparation Example 5

Preparation of Sulfated Glycerol-EO Adduct (Average Addition Mole Number 3) (a-05)

(1) Glycerol-ED Adduct (Average Addition Mole Number 3)

In a 2 L autoclave equipped with a stiller, 230.3 g of glycerol and 1.4 g of KOH were stirred at about 600 rpm. The inside of the system was replaced with nitrogen, and raised to 155° C. To this reaction mixture was added 330.3 g of ethylene oxide (hereinafter, referred to as EO), which amount corresponded to 3 moles of EO per one mole of glycerol, under conditions of a pressure of 0.1 to 0.3 MPa (gauge pressure) and a temperature of 155° C. After a pressure that had been decreasing after EO introduced became stable (the end of the reaction), the system was cooled to 80° C. to give a glycerol-EO adduct (average addition mole number 3) (hydroxy group value: 739.3 mgKOH/g). In this Preparation Example, an EO distribution was as follows: unreacted glycerol (EO=0 mol): 2.9%, EO=1 mol: 11.3%, EO=2 mol: 22.4%, EO=3 mol: 26.1%, EO=4 mol: 19.7%, EO=5 mol: 10.7%, EO=6 mol: 4.6%, EO=7 mol: 1.7%, EO=8 mol: 0.5%, EO=9 mol: 0.2% (% by weight).

(2) Sulfated Glycerol-EO Adduct (Average Addition Mole Number 3) (a-05)

An aqueous solution of sulfated glycerol-EO adduct (average addition mole number 3) (a-05) was prepared from the glycerol-EO adduct (average addition mole number 3) obtained in (1) by the same method as of Preparation Example 1, except that a reaction molar ratio was ($SO_3$/glycerol)=1.0 (acid value of sulfated product: 188.7 mgKOH/g), and a temperature was 42 to 56° C. The pH of the aqueous solution was 11.1, a volatile matter content was 70.0% by weight, and sodium sulfate was 0.1% by weight. Infrared absorption spectroscopy for nonvolatile matter showed an absorption associated with a sulfate ester bond at 1215 $cm^{-1}$.

Preparation Example 6

Preparation of Sulfated Glycerol-EO Adduct (Average Addition Mole Number 1) (a-06)

(1) Glycerol-EO Adduct (Average Addition Mole Number 1)

A glycerol-EO adduct (average addition mole number 1) was similarly prepared by adding ED to glycerol according to the method of Preparation Example 5 (1). In this Preparation Example, an EO distribution was as follows: unreacted glycerol (EO=0 mol): 36.1%, EO=1 mol: 37.0%, EO=2 mol: 19.1%, EO=3 mol: 6.1%, EO=4 mol: 1.3%, EO=5 mol: 0.2% (% by weight).

(2) Sulfated Glycerol-Ed Adduct (Average Addition Mole Number 1) (a-06)

An aqueous solution of sulfated glycerol-EO adduct (average addition mole number 1) (a-06) was prepared from the glycerol-EO adduct (average addition mole number 1) obtained in (1) by the same method as of Preparation Example 1, except that a reaction molar ratio was ($SO_3$/glycerol)=0.9 (acid value of sulfated product: 231.4 mgKOH/g), and a temperature was 49 to 68° C. The pH of the aqueous solution was 8.2, a volatile matter content was 65.9% by weight, and sodium sulfate was 0.6% by weight. Infrared absorption spectroscopy for nonvolatile matter showed an absorption associated with a sulfate ester bond at 1213 $cm^{-1}$.

<Ingredient of a Dispersant>
(2) Component (C)

For the component (C), copolymers C-1 and C-2 obtained in Preparation Examples C-1 and C-2 below were used.

Preparation Example C-1

Preparation of Copolymer C-1

In a glass reactor (four-neck flask) equipped with a stirrer, 395 g of water was stirred. The inside of the reactor was replaced with nitrogen with stirring, and the water was heated to 80° C. under an nitrogen atmosphere. To this were added a mixed solution of 261 g of ω-methoxypolyethylene glycol monomethacrylate (addition mole number of ethylene oxide: 23, NK ester M230G, Shin-Nakamura Chemical Corporation), 67.3 g of Phosmer M (mixture of mono(2-hydroxyethyl)methacrylic acid phosphate ester and di(2-hydroxyethyl)methacrylic acid phosphate ester, Uni-chemical Co., Ltd.) and 4.3 g of mercaptopropionic acid in 141 g of water and a solution of 8.0 g of ammonium persulfate in 45 g of water each dropwise for 1.5 hours. The mixture was aged for 1 hour. Then, to this was further added a solution of 1.8 g of ammonium persulfate in 10 g of water dropwise for 30 minutes, and aged for additional 1.5 hours. During a series of operations, the reaction system was hold at 80° C. The aged mixture was cooled to 40° C. or lower, and neutralized with 66 g of solution of 30% sodium hydroxide to give a copolymer C-1 having a molecular weight of 37000. The product was adjusted to have a solid content of 20% with ion-exchanged water.

Preparation Example C-2

Preparation of Copolymer C-2

In a glass reactor (four-neck flask) equipped with a stirrer, 355 g of water was stirred. The inside of the reactor was replaced with nitrogen with stirring, and the water was heated to 80° C. under an nitrogen atmosphere. To this were added a mixed solution of 509 g of 60% by weight of ω-methoxypolyethylene glycol monomethacrylate (addition mole number of ethylene oxide: 120, ester purity: 97% in water), 35.6 g of Phosmer M (mixture of mono(2-hydroxyethyl)methacrylic acid phosphate ester and di(2-hydroxyethyl)methacrylic acid phosphate ester, Uni-chemical Co., Ltd.) and 2.0 g of mercaptopropionic acid and a solution of 2.9 g of ammonium persulfate in 45 g of water each dropwise for 1.5 hours. The mixture was aged for 1 hour. Then, to this was further added a solution of 0.6 g of ammonium persulfate in 15 g of water dropwise for 30 minutes, and aged for additional 1.5 hours. During a series of operations, the reaction system was hold at 80° C. The aged mixture was cooled to 40° C. or lower, and neutralized with 35.0 g of solution of 30% sodium hydroxide to give a copolymer C-2 having a molecular weight of 48000. The product was adjusted to have a solid content of 20% with ion-exchanged water.

(3) Component (D)

For the component (D), copolymers D-1 to D-5 obtained in Preparation Examples D-1 to D-5 below were used.

Preparation Example D-1

Preparation of Copolymer D-1

In a glass reactor (four-neck flask) equipped with a stirrer, 141 g of water was stirred. The inside of the reactor was replaced with nitrogen with stirring, and the water was heated to 80° C. under an nitrogen atmosphere. To this were added a mixed solution of 300 g of aqueous solution of 60% by weight of ω-methoxypolyethylene glycol monomethacrylate (average addition mole number of ethylene oxide: 120, ester purity: 100%), 25.9 g of methacrylic acid (reagent, Wako Pure Chemical Industries, Ltd.) and 1.96 g of mercaptopropionic acid and a solution of 3.82 g of ammonium persulfate in 45 g of water each dropwise for 1.5 hours. The mixture was aged for 1 hour. Then, to this was further added a solution of 1.53 g of ammonium persulfate in 15 g of water dropwise for 30 minutes, and aged for additional 1.5 hours. During a series of operations, the reaction system was hold at 80° C. The aged mixture was cooled to 40° C. or lower, and neutralized with 19.4 g of solution of 48% sodium hydroxide to give a copolymer D-1 having a weight average molecular weight of 70000. The product was adjusted to have a solid content of 20% with ion-exchanged water.

Preparation Example D-2

Preparation of Copolymer D-2

In a glass reactor (four-neck flask) equipped with a stirrer, 333 g of water was stirred. The inside of the reactor was replaced with nitrogen with stirring, and the water was heated to 80° C. under an nitrogen atmosphere. To this were added a mixed solution of 300 g of ω-methoxypolyethylene glycol monomethacrylate (average addition mole number of ethylene oxide: 23, NK ester M230G, Shin-Nakamura Chemical Corporation), 69.7 g of methacrylic acid (reagent, Wako Pure Chemical Industries, Ltd.) and 6.3 g of mercaptopropionic acid in 200 g of water and a solution of 12.3 g of ammonium persulfate in 45 g of water each dropwise for 1.5 hours. The mixture was aged for 1 hour. Then, to this was further added a solution of 4.9 g of ammonium persulfate in 15 g of water dropwise for 30 minutes, and aged for additional 1.5 hours. During a series of operations, the reaction system was hold at 80° C. The aged mixture was cooled to 40° C. or lower, and neutralized with 50.2 g of solution of 48% sodium hydroxide to give a copolymer D-2 having a weight average molecular weight of 43000. The product was adjusted to have a solid content of 20% with ion-exchanged water.

Preparation Example D-3

Preparation of Copolymer D-3

In a glass reactor (four-neck flask) equipped with a stirrer, 145 g of water was stirred. The inside of the reactor was replaced with nitrogen with stirring, and the water was heated to 80° C. under an nitrogen atmosphere. To this were added a mixed solution of 230 g of 70% solution of ω-methoxypolyethylene glycol monoacrylate (average addition mole number of ethylene oxide: 23, NK ester AM230G, Shin-Nakamura Chemical Corporation) and 32.1 g of acrylic acid (reagent, Wako Pure Chemical Industries, Ltd., purity: 99%), a solution of 1.44 g of mercaptopropionic acid in 28.6 g of water and a solution of 1.34 g of ammonium persulfate in 13.4 g of water each dropwise for 1.5 hours. To this was further added a solution of 0.67 g of ammonium persulfate in 6.7 g of water dropwise for 30 minutes, and aged for one hour. During a series of operations, the reaction system was hold at 80° C. The aged mixture was cooled to 40° C. or lower, and neutralized with 53 g of solution of 40% sodium hydroxide to give a copolymer D-3 having a weight average molecular weight of 43000. The product was adjusted to have a solid content of 20% with ion-exchanged water.

Preparation Example D-4

Preparation of Copolymer D-4

In a glass reactor (four-neck flask) equipped with a stirrer, 225 g of water and 300 g of polyoxyethylene (average addition mole number of ethylene oxide: 30) allyl ether were stirred. The inside of the reactor was replaced with nitrogen with stirring, and the mixture was heated to 80° C. under an nitrogen atmosphere. To this were added a mixed solution of 47.4 g of maleic acid (reagent, Wako Pure Chemical Industries, Ltd., purity: 99%) and 3.7 g of mercaptopropionic acid in 137 g of water and a solution of 7.1 g of ammonium persulfate in 90 g of water each dropwise for 2.5 hours. The mixture was aged for 2 hours. To this was further added a solution of 2.8 g of ammonium persulfate in 45 g of water dropwise for 60 minutes, and aged for additional 2 hours. During a series of operations, the reaction system was hold at 80° C. The aged mixture was cooled to 40° C. or lower, and neutralized with 26.6 g of solution of 48% sodium hydroxide to give a copolymer D-4 having a weight average molecular weight of 31000. The product was adjusted to have a solid content of 20% with ion-exchanged water.

Preparation Example D-5

Preparation of Copolymer D-5

In a glass reactor (four-neck flask) equipped with a stirrer, 406 g of aqueous solution of 65% polyoxyethylene (average addition mole number of ethylene oxide: 100) allyl ether was heated to 65° C. To this was added 20.1 g of aqueous solution of 2% hydrogen peroxide dropwise. Then, to this was added 38.4 g of acrylic acid dropwise for 3.0 hours and simultaneously a mixed monomer solution of 1.26 g of 3-mercaptopropionic acid (Sigma-Aldrich Japan K.K., reagent) and 0.52 g of L-ascorbic acid in 33.8 g of ion-exchanged water dropwise for 3.5 hours. Then, the mixture was hold at 65° C. for one hour to complete the reaction, and neutralized with an aqueous solution of 20% sodium hydroxide to give a copolymer D-5 having a weight average molecular weight of 60000. The product was adjusted to have a solid content of 20% with ion-exchanged water.

<Preparation and Evaluation of Mortar>

(1) Preparation of Mortar

In a mortar mixer (a versatile mixing stirrer, model: 5DM-03-γ, Dalton Corporation), cement (C) and fine aggregates (S), as shown in Table 1, were subjected to dry mixing for 10 seconds. To the mixture was added mixing water (W) containing an additive composition for hydraulic compositions (used as an aqueous solution containing 25% by weight of solids) in such an amount as achieving a target slump 21±1 cm and a target air-entraining amount 2±1%. The mixture was subjected to main kneading for 60 seconds at a low speed rotation and then for 120 seconds at a high speed rotation. In this Example, dosages (% by weight) of the compound (a) and a dispersant (effective content) to a cement weight, or parts by weight thereof to 100 parts by weight of cement were as shown in Tables 2 and 3. The compound (a) and a dispersant were added to the mixing water in such amounts as satisfying amounts shown in Tables 2 and 3. An effective content of the dispersant refers a solid content of the copolymers C-1 to 2 and/or D-1 to 5.

TABLE 1

| W/C (wt. %) | Unit amount (kg/m³) | | | Air amount (%) |
|---|---|---|---|---|
| | W | C | S | |
| 40.0 | 160 | 400 | 700 | 2.0 |

Cement (C): ordinary Portland cement (ordinary Portland cement of Taiheiyo Cement Corporation/ordinary Portland cement of Sumitomo Osaka Cement Co., Ltd = 1/1, weight ratio), density: 3.16 g/cm³
Fine aggregate (S): area: Joyo, pit sand, FM = 2.67, density: 2.56 g/cm³
Water (W): tap water (2) Evaluation of Mortar Mortars were evaluated for demolding strength and slump flow according to the following test methods. Evaluation results are shown in Tables 2 and 3.

(2-1) Evaluation for Demolding Strength

According to JIS A 1132, mortar samples were filled up to by two layers in a cylindrical plastic mold (diameter of a base: 5 cm, height: 10 cm) and aged in the air (20° C.) for 16 hours in a room at 20° C. to prepare a sample. The sample was measured for compressive strength according to JIS A 1108. For each compressive strength of Examples, a relative value to that of Comparative Example 1-1 represented by a strength ratio (%) was also shown together in Tables 2 and 3.

(2-2) Evaluation for Slump Flow

A mortar immediately after prepared according to the method described above was filled in a flow corn in a two-layer mode according to JIS R 5201. The flow corn was removed upward, and the mortar was measured for flow lengths in a direction of the maximum flow length and a direction orthogonal to the direction. In this Example, the falling motion described in JIS R 5201 was not performed.

TABLE 2

| | | Compound (a) | | | | Dispersant | | |
|---|---|---|---|---|---|---|---|---|
| | | Kind | dosage (parts by weight) | Sulfation ratio | Mole number of a sulfaating agent per one mole of hydroxy group dispersant used | Kind | copolymer (D)/ copolymer (C) (weight ratio) | dosage (parts by weight) |
| Comparative example | 1-1 | — | — | — | — | Copolymer C-1/copolymer D-1 = 8/2(weight ratio) | 25/100 | 0.18 |
| | 1-2 | glucerol | 0.10 | — | — | Copolymer C-1/copolymer D-1 = 8/2(weight ratio) | 25/100 | 0.18 |
| | 1-3 | glucerol | 0.20 | — | — | Copolymer C-1/copolymer D-1 = 8/2(weight ratio) | 25/100 | 0.18 |
| | 1-4 | glucerol | 0.50 | — | — | Copolymer C-1/copolymer D-1 = 8/2(weight ratio) | 25/100 | 0.18 |
| | 1-5 | glucerol | 1.00 | — | — | Copolymer C-1/copolymer D-1 = 8/2(weight ratio) | 25/100 | 0.18 |
| | 1-6 | sodium sulfate | 0.2 | — | — | Copolymer C-1/copolymer D-1 = 8/2(weight ratio) | 25/100 | 0.18 |
| Example | 1-1 | a-01 | 0.10 | 0.9 | 0.3 | Copolymer C-1/copolymer D-1 = 8/2(weight ratio) | 25/100 | 0.18 |
| | 1-2 | a-01 | 0.20 | 0.9 | 0.3 | Copolymer C-1/copolymer D-1 = 8/2(weight ratio) | 25/100 | 0.18 |
| | 1-3 | a-01 | 0.27 | 0.9 | 0.3 | Copolymer C-1/copolymer D-1 = 8/2(weight ratio) | 25/100 | 0.18 |
| | 1-4 | a-01 | 0.50 | 0.9 | 0.3 | Copolymer C-1/copolymer D-1 = 8/2(weight ratio) | 25/100 | 0.18 |
| | 1-5 | a-01 | 0.68 | 0.9 | 0.3 | Copolymer C-1/copolymer D-1 = 8/2(weight ratio) | 25/100 | 0.18 |
| | 1-6 | a-01 | 1.00 | 0.9 | 0.3 | Copolymer C-1/copolymer D-1 = 8/2(weight ratio) | 25/100 | 0.18 |
| | 1-7 | a-01 | 1.37 | 0.9 | 0.3 | Copolymer C-1/copolymer D-1 = 8/2(weight ratio) | 25/100 | 0.18 |
| | 1-8 | a-02 | 0.20 | 1.2 | 0.4 | Copolymer C-1/copolymer D-1 = 8/2(weight ratio) | 25/100 | 0.18 |
| | 1-9 | a-03 | 0.20 | 1.0 | 0.3 | Copolymer C-1/copolymer D-1 = 8/2(weight ratio) | 25/100 | 0.18 |
| | 1-10 | a-04 | 0.20 | 2.0 | 0.7 | Copolymer C-1/copolymer D-1 = 8/2(weight ratio) | 25/100 | 0.18 |
| | 1-11 | a-05 | 0.20 | 1.0 | 0.3 | Copolymer C-1/copolymer D-1 = 8/2(weight ratio) | 25/100 | 0.18 |
| | 1-12 | a-06 | 0.20 | 0.9 | 0.3 | Copolymer C-1/copolymer D-1 = 8/2(weight ratio) | 25/100 | 0.18 |

TABLE 2-continued

| | | | Additive composition for hydraulic compositions | | | Mortar evaluation | | |
|---|---|---|---|---|---|---|---|---|
| | | | compounding amount (wt. %) | [(C) + (D)]/ | dosage | demolding | strength | Slump flow |
| | | | Compound (a) | component (C) + component (D) | compound (a) (weight ratio) | (weight part) | strength (N/mm$^2$) | ratio (%) | value (mm) |
| Comparative example | 1-1 | — | 25.0 | — | 0.18 | 11.7 | standard | 171 × 167 |
| | 1-2 | — | 16.0 | — | 0.28 | 11.9 | 101.7 | 168 × 167 |
| | 1-3 | — | 11.8 | — | 0.38 | 10.5 | 89.7 | 158 × 154 |
| | 1-4 | — | 6.5 | — | 0.68 | 8.3 | 70.9 | 168 × 167 |
| | 1-5 | — | 3.8 | — | 1.18 | 4.8 | 41.0 | 158 × 154 |
| | 1-6 | — | 11.8 | — | 0.38 | 11.8 | 100.9 | 146 × 145 |
| Example | 1-1 | 8.9 | 16.1 | 64/36 | 0.28 | 12.8 | 109.4 | 171 × 168 |
| | 1-2 | 13.2 | 11.8 | 47/53 | 0.38 | 13.1 | 112.0 | 173 × 170 |
| | 1-3 | 15.0 | 10.0 | 40/60 | 0.45 | 13.2 | 112.8 | 170 × 169 |
| | 1-4 | 18.4 | 6.4 | 26/74 | 0.68 | 14.1 | 120.5 | 171 × 168 |
| | 1-5 | 19.8 | 5.2 | 21/79 | 0.86 | 14.7 | 125.6 | 167 × 165 |
| | 1-6 | 21.2 | 3.8 | 15/85 | 1.18 | 15.3 | 130.8 | 160 × 157 |
| | 1-7 | 22.1 | 2.9 | 12/88 | 1.55 | 17.1 | 146.2 | 158 × 155 |
| | 1-8 | 13.2 | 11.8 | 47/53 | 0.38 | 13.0 | 111.1 | 165 × 163 |
| | 1-9 | 13.2 | 11.8 | 47/53 | 0.38 | 12.5 | 106.8 | 170 × 168 |
| | 1-10 | 13.2 | 11.8 | 47/53 | 0.38 | 12.4 | 106.0 | 166 × 165 |
| | 1-11 | 13.2 | 11.8 | 47/53 | 0.38 | 12.7 | 108.5 | 174 × 172 |
| | 1-12 | 13.2 | 11.8 | 47/53 | 0.38 | 13.0 | 111.1 | 172 × 171 |

TABLE 3

| | | Compond (a) | | | | Dispersant | | |
|---|---|---|---|---|---|---|---|---|
| | | Kind | dosage (parts by weight) | Sulfation ratio | Mole number of a sulfaating agent per one mole of hydroxy group dispersant used | Kind | component (D)/ component (C) (weight ratio) | dosage (parts by weight) |
| Comparative Example | 2-1 | — | — | — | — | Copolymer C-1/copolymer D-1 = 8/2(weight ratio) | 25/100 | 0.18 |
| Example | 2-1 | a-01 | 0.20 | 0.9 | 0.3 | Copolymer C-1 | 0/100 | 0.2 |
| | 2-2 | a-01 | 0.20 | 0.9 | 0.3 | Copolymer C-2 | 0/100 | 0.16 |
| | 2-3 | a-01 | 0.20 | 0.9 | 0.3 | Copolymer D-1 | 100/0 | 0.12 |
| | 2-4 | a-01 | 0.20 | 0.9 | 0.3 | Copolymer D-2 | 100/0 | 0.18 |
| | 2-5 | a-01 | 0.20 | 0.9 | 0.3 | Copolymer D-3 | 100/0 | 0.17 |
| | 2-6 | a-01 | 0.20 | 0.9 | 0.3 | Copolymer D-4 | 100/0 | 0.24 |
| | 2-7 | a-01 | 0.20 | 0.9 | 0.3 | Copolymer D-5 | 100/0 | 0.16 |
| | 2-8 | a-01 | 0.20 | 0.9 | 0.3 | Copolymer C-1/copolymer D-1 = 8/2(weight ratio) | 25/100 | 0.18 |
| | 2-9 | a-01 | 0.20 | 0.9 | 0.3 | Copolymer C-1/copolymer D-1 = 7/3(weight ratio) | 43/100 | 0.17 |
| | 2-10 | a-01 | 0.20 | 0.9 | 0.3 | Copolymer C-1/copolymer D-1 = 6/4(weight ratio) | 67/100 | 0.15 |
| | 2-11 | a-01 | 0.20 | 0.9 | 0.3 | Copolymer C-1/copolymer D-1 = 5/5(weight ratio) | 100/100 | 0.14 |
| | 2-12 | a-01 | 0.20 | 0.9 | 0.3 | Copolymer C-2/copolymer D-1 = 8/2(weight ratio) | 25/100 | 0.15 |
| | 2-13 | a-01 | 0.20 | 0.9 | 0.3 | Copolymer C-2/copolymer D-2 = 8/2(weight ratio) | 25/100 | 0.16 |
| | 2-14 | a-01 | 0.27 | 0.9 | 0.3 | Copolymer C-2/copolymer D-3 = 8/2(weight ratio) | 25/100 | 0.16 |
| | 2-15 | a-01 | 0.27 | 0.9 | 0.3 | Copolymer C-1/copolymer D-4 = 8/2(weight ratio) | 25/100 | 0.22 |
| | 2-16 | a-01 | 0.50 | 0.9 | 0.3 | Copolymer C-1/copolymer D-5 = 8/2(weight ratio) | 25/100 | 0.18 |
| | 2-17 | a-01 | 0.20 | 0.9 | 0.3 | Copolymer D-3/copolymer D-5 = 5/5(weight ratio) | 100/0 | 0.16 |

TABLE 3-continued

| | | Additive composition for hydraulic compositions | | | | Mortar evaluation | | |
|---|---|---|---|---|---|---|---|---|
| | | compounding amount (wt. %) | | [(C) + (D)]/ | dosage | demolding | strength | Slump flow |
| | | Compound (a) | component (C) + component (D) | compond (a) (weight ratio) | (parts by weight) | strength (N/mm$^2$) | ratio (%) | value (mm) |
| Comparative Example | 2-1 | — | 25.0 | — | 0.18 | 11.7 | standard | 171 × 167 |
| Example | 2-1 | 12.5 | 12.5 | 50/50 | 0.4 | 12.8 | 109.4 | 160 × 158 |
| | 2-2 | 13.9 | 11.0 | 44/56 | 0.36 | 13.7 | 117.1 | 174 × 173 |
| | 2-3 | 15.6 | 9.5 | 38/62 | 0.32 | 14.2 | 121.4 | 177 × 175 |
| | 2-4 | 13.2 | 11.8 | 47/53 | 0.38 | 13.0 | 111.1 | 171 × 170 |
| | 2-5 | 13.5 | 11.5 | 46/54 | 0.37 | 14.0 | 119.7 | 168 × 167 |
| | 2-6 | 11.4 | 13.8 | 55/45 | 0.44 | 12.5 | 106.6 | 166 × 163 |
| | 2-7 | 13.9 | 11.0 | 44/56 | 0.36 | 13.0 | 111.1 | 174 × 174 |
| | 2-8 | 13.2 | 11.8 | 47/53 | 0.38 | 13.1 | 112.0 | 173 × 170 |
| | 2-9 | 13.5 | 11.5 | 46/54 | 0.37 | 13.4 | 114.5 | 175 × 174 |
| | 2-10 | 14.3 | 10.8 | 43/57 | 0.35 | 13.7 | 117.1 | 173 × 173 |
| | 2-11 | 14.7 | 10.3 | 41/59 | 0.34 | 13.8 | 117.9 | 177 × 176 |
| | 2-12 | 14.3 | 10.8 | 43/57 | 0.35 | 14.0 | 119.7 | 178 × 178 |
| | 2-13 | 13.9 | 11.0 | 44/56 | 0.36 | 13.5 | 115.4 | 172 × 171 |
| | 2-14 | 15.7 | 9.3 | 37/63 | 0.43 | 13.9 | 118.8 | 170 × 169 |
| | 2-15 | 13.8 | 11.3 | 45/55 | 0.49 | 12.6 | 107.7 | 170 × 168 |
| | 2-16 | 18.4 | 6.5 | 26/74 | 0.68 | 12.8 | 109.4 | 172 × 172 |
| | 2-17 | 13.9 | 11.0 | 44/56 | 0.36 | 13.7 | 117.1 | 166 × 165 |

In Tables 2 and 3, for respective ingredients, a dosage is a dosage to mortar (parts by weight) based on an effective amount (solid content) of an ingredient to 100 parts by weight of cement.

The invention claimed is:

1. An early strengthening agent for hydraulic compositions, comprising a sulfate ester (A) selected from the group consisting of sulfuric acid triesters of glycerol, glycerol-EO adducts or glycerol-PO adducts; sulfuric acid diesters of glycerol, glycerol-EO adducts or glycerol-PO adducts; and sulfuric acid monoester of glycerol, glycerol-EO adducts or glycerol-PO adducts.

2. An additive composition for hydraulic compositions, comprising the early strengthening agent for hydraulic compositions according to claim 1 and a dispersant.

3. A hydraulic composition, comprising the early strengthening agent for hydraulic compositions according to claim 1, a hydraulic powder, aggregates and water.

4. The hydraulic composition according to claim 3, further comprising a dispersant.

5. A concrete product, comprising the early strengthening agent for hydraulic compositions according to claim 1.

6. An additive composition for hydraulic compositions, comprising the early strengthening agent for hydraulic compositions according to claim 1 and a dispersant.

7. A hydraulic composition, comprising the early strengthening agent for hydraulic compositions according to claim 1, a hydraulic powder, aggregates and water.

8. The hydraulic composition according to claim 7, further comprising a dispersant.

9. A concrete product, comprising the early strengthening agent for hydraulic compositions according to claim 1.

10. An additive composition for hydraulic compositions, comprising the early strengthening agent for hydraulic compositions according to claim 1 and a dispersant, wherein the content of the sulfate ester is 5 to 95% by weight.

11. A hydraulic composition, comprising the early strengthening agent for hydraulic compositions according to claim 1, a hydraulic powder, aggregates and water, wherein the amount of the sulfate ester is 0.01 to 5 parts by weight to 100 parts by weight of the hydraulic powder.

12. The additive composition for hydraulic compositions according to claim 10, wherein the dispersant further comprises (C) a phosphate ester polymer at a weight ratio of the total amount of the sulfate ester to the total amount of the component (C) within 5/95 to 65/35.

13. The additive composition for hydraulic compositions according to claim 10, wherein the dispersant comprises (D) a copolymer containing structural units derived from a monomer (i) represented by the following formula (D1-1) and structural units derived from a monomer (ii) selected from the group consisting of a monomer represented by the following formula (D1-2) and a monomer represented by the following formula (D1-3):

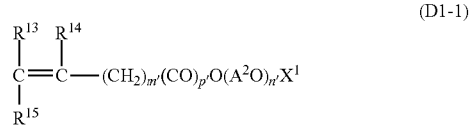

(D1-1)

wherein, $R^{13}$ and $R^{14}$ each represent a hydrogen atom or —$CH_3$;

$R^{15}$ represents a hydrogen atom or —$COO(AO)_nX$;

$A^2$ represents an alkylene group having 2 to 4 carbon atoms;

$X^1$ represents a hydrogen atom or an alkyl group having 1 to 18 carbon atoms;

m' represents the number of 0 to 2;

n' represents the number of 2 to 300; and p' represents the number of 0 or 1;

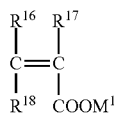 (D1-2)

wherein, $R^{16}$, $R^{17}$ and $R^{18}$, that may be the same as or different from, each represent a hydrogen atom, —$CH_3$ or $(CH_2)_r COOM^2$, where $(CH_2)_r COOM^2$ may form an anhydride with $COOM^1$ or other $(CH_2)_r COOM^2$, and in this case, $M^1$ and $M^2$ thereof do not present;

$M^1$ and $M^2$ each represent a hydrogen atom, an alkaline metal, an alkaline earth metal (1/2 atoms), an ammonium group, an alkylammonium group or a substituted alkylammonium group; and r represents the number of 0 to 2;

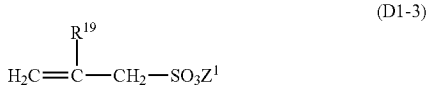 (D1-3)

wherein, $R^{19}$ represents a hydrogen atom or —$CH_3$; and $Z^1$ represents a hydrogen atom, an alkaline metal, an alkaline earth metal (1/2 atoms), an ammonium group, an alkylammonium group or a substituted alkylammonium group;

at a weight ratio of the total amount of the sulfate ester to the total amount of the component (D) within 5/95 to 65/35.

14. The additive composition for hydraulic compositions according to claim 13, wherein the dispersant further comprises (C) a phosphate ester polymer at a weight ratio of (D)/(C) of 3/100 to 65/100.

15. The hydraulic composition according to claim 10, further comprising (C) a phosphate ester polymer at a weight ratio of the total amount of the sulfate ester to the total amount of the component (C) within 5/95 to 65/35.

16. The hydraulic composition according to claim 10, further comprising (D) a copolymer containing structural units derived from a monomer (i) represented by the following formula (D1-1) and structural units derived from a monomer (ii) selected from the group consisting of a monomer represented by the following formula (D1-2) and a monomer represented by the following formula (D1-3):

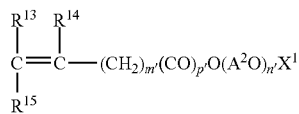 (D1-1)

wherein, $R^{13}$ and $R^{14}$ each represent a hydrogen atom or —$CH_3$;

$R^{15}$ represents a hydrogen atom or —$COO(AO)_n X$;

$A^2$ represents an alkylene group having 2 to 4 carbon atoms;

$X^1$ represents a hydrogen atom or an alkyl group having 1 to 18 carbon atoms;

m' represents the number of 0 to 2;

n' represents the number of 2 to 300; and p' represents the number of 0 or 1;

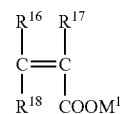 (D1-2)

wherein, $R^{16}$, $R^{17}$ and $R^{18}$, that may be the same as or different from, each represent a hydrogen atom, —$CH_3$ or $(CH_2)_r COOM^2$, where $(CH_2)_r COOM^2$ may form an anhydride with $COOM^1$ or other $(CH_2)_r COOM^2$, and in this case, $M^1$ and $M^2$ thereof do not present;

$M^1$ and $M^2$ each represent a hydrogen atom, an alkaline metal, an alkaline earth metal (1/2 atoms), an ammonium group, an alkylammonium group or a substituted alkylammonium group; and r represents the number of 0 to 2;

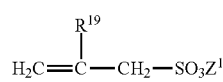 (D1-3)

wherein, $R^{19}$ represents a hydrogen atom or —$CH_3$; and $Z^1$ represents a hydrogen atom, an alkaline metal, an alkaline earth metal (1/2 atoms), an ammonium group, an alkylammonium group or a substituted alkylammonium group;

at a weight ratio of the total amount of the sulfate ester to the total amount of the component (D) within 5/95 to 65/35.

* * * * *